United States Patent
Dietermann

(10) Patent No.: US 10,570,597 B2
(45) Date of Patent: Feb. 25, 2020

(54) VALVE FITTING FOR FILLING A SANITARY CISTERN, AND SANITARY CISTERN COMPRISING A VALVE FITTING OF THIS KIND

(71) Applicant: Viega Technology GmbH & Co. KG, Attendorn (DE)

(72) Inventor: Patrick Dietermann, Lennestadt (DE)

(73) Assignee: Viega Technology GmbH & Co. KG, Attendorn (DE)

(*) Notice: Subject to any disclaimer, the term of this patent is extended or adjusted under 35 U.S.C. 154(b) by 0 days.

(21) Appl. No.: 15/781,834

(22) PCT Filed: Dec. 23, 2016

(86) PCT No.: PCT/EP2016/082532
§ 371 (c)(1),
(2) Date: Jun. 6, 2018

(87) PCT Pub. No.: WO2017/118583
PCT Pub. Date: Jul. 13, 2017

(65) Prior Publication Data
US 2018/0371731 A1 Dec. 27, 2018

(30) Foreign Application Priority Data
Jan. 7, 2016 (DE) ............ 20 2016 000 056 U

(51) Int. Cl.
*E03D 1/32* (2006.01)
*F16K 31/26* (2006.01)
(Continued)

(52) U.S. Cl.
CPC ............ *E03D 1/32* (2013.01); *E03C 1/021* (2013.01); *E03D 1/33* (2013.01); *F16K 31/26* (2013.01);
(Continued)

(58) Field of Classification Search
CPC ......... E03D 1/32; E03D 1/012; E03D 1/0125; E03D 1/304; E03D 1/306; E03D 1/308; E03D 1/33; E03C 1/021; E03C 2001/026; Y10T 137/7368; Y10T 137/7371; Y10T 137/7374; Y10T 137/87915; Y10T 137/87925; F16K 27/06; F16K 27/062; F16K 27/065; F16K 27/067; F16K 31/60; F16K 31/602; F16K 31/24; F16K 31/26; F16K 31/18; F16K 31/20; F16K 31/22; F16K 31/265
See application file for complete search history.

(56) References Cited

U.S. PATENT DOCUMENTS 972,738 A * 10/1910 Townsend ............... F16K 31/22
119/80
7,373,953 B2 5/2008 Minnick
(Continued)

FOREIGN PATENT DOCUMENTS

CN 2211531 Y 11/1995
CN 2364306 Y 2/2000
(Continued)

*Primary Examiner* — Reinaldo Sanchez-Medina
*Assistant Examiner* — Hailey K. Do
(74) *Attorney, Agent, or Firm* — The Webb Law Firm

(57) ABSTRACT

A valve fitting for filling a sanitary cistern includes a connection element, a shutoff valve including an actuation element, and a float-actuated filling valve. The connection element, shutoff valve and filling valve are interconnected to form a water passage into the cistern. A float is connected to the filling valve. The actuation element of the shutoff valve is rotatable about a rotational axis when the float is in the operating position thereof, the shutoff valve being operationally usable in the valve fitting in at least two different positions, the connection element configured to be mounted at an opening in the left-hand cistern side wall in one of the positions, and at an opening in the right-hand cistern side wall in another of the positions, and the actuation element being accessible from the front of the valve fitting in the at least two positions of the shutoff valve.

13 Claims, 4 Drawing Sheets

(51) Int. Cl.
  *E03D 1/33*      (2006.01)
  *F16K 31/60*     (2006.01)
  *E03C 1/02*      (2006.01)

(52) U.S. Cl.
  CPC ....... *F16K 31/602* (2013.01); *Y10T 137/7368* (2015.04)

(56) References Cited

U.S. PATENT DOCUMENTS

| | | |
|---|---|---|
| 8,276,610 B2 | 10/2012 | Broughman |
| 2015/0013806 A1 | 1/2015 | McCoy et al. |
| 2015/0122342 A1 | 5/2015 | Ismert |

FOREIGN PATENT DOCUMENTS

| | | | | |
|---|---|---|---|---|
| CN | 2727250 Y | | 9/2005 | |
| CN | 101680216 A | | 3/2010 | |
| DE | 29704484 U1 | * | 6/1997 | ........... F16K 5/0647 |
| DE | 10032125 A1 | | 1/2002 | |
| DE | 102004042932 A1 | | 3/2006 | |
| DE | 60207871 T2 | | 7/2006 | |
| DE | 102010011366 A1 | * | 5/2014 | ............. E03D 5/006 |
| EP | 1172490 A2 | | 1/2002 | |
| EP | 1932973 A1 | | 6/2008 | |
| EP | 1956152 A1 | | 8/2008 | |
| EP | 2481856 A1 | | 8/2012 | |
| EP | 2722573 A2 | * | 4/2014 | ............... F24C 3/126 |
| FR | 1387727 A | * | 1/1965 | ............... E03D 1/34 |
| WO | 03021051 A1 | | 3/2003 | |
| WO | WO-2008020367 A2 | * | 2/2008 | ............. E03B 7/075 |

\* cited by examiner

VALVE FITTING FOR FILLING A SANITARY CISTERN, AND SANITARY CISTERN COMPRISING A VALVE FITTING OF THIS KIND

CROSS-REFERENCE TO RELATED APPLICATIONS

This application is the United States national phase of International Application No. PCT/EP2016/082532 filed Dec. 23, 2016, and claims priority to German Patent Application No. 20 2016 000 056.0 filed Jan. 7, 2016, the disclosures of which are hereby incorporated in their entirety by reference.

BACKGROUND OF THE INVENTION

Field of the Invention

The invention relates to a valve fitting for filling a sanitary cistern, in particular a built-in cistern, comprising a connection element for connecting the valve fitting to a water supply line, a shutoff valve comprising an actuation element for manually shutting off the inflow from the water supply line, and a float-actuated filling valve, the connection element, the shutoff valve and the filling valve being able to be releasably interconnected in order to form a water passage such that water can be supplied from the water supply line into the interior of the cistern, and a float that is connected to the filling valve being movable by a rising water level in the cistern, and the filling valve closing, and thus interrupting the inflow via the water passage, when a specified or specifiable water level has been reached. The invention further relates to a sanitary cistern comprising a valve fitting of this kind.

Description of Related Art

Various embodiments of valve fittings of this kind for filling a cistern are known. Said fittings are also referred to as a water passage and typically comprise what is known as a filling valve, the valve body of which is actuated by means of a float. The float continues to be moved upwards by the rising water level while the cistern is being filled, and in the process acts on the valve body which closes the filling valve when a specific water level is reached.

A valve arrangement of this kind is known from EP 2 481 856 A1 for example.

In cost-effective embodiments of sanitary cisterns, relatively simply designed water passages (filling valve units) are often used. In this case, the components of the water passage, primarily rigid plastics materials parts, are rigidly interconnected in solid arrangement. The water passage is thus designed for a specific positioning of the water supply line and cannot be changed. However, due to special conditions at the installation site, it may be necessary or desirable, when installing the cistern, to attach the water supply line to the cistern on the right-hand side thereof and not, as standard, on the left-hand side thereof.

A built-in cistern is known from EP 1 932 973 B1, which cistern comprises a tank body and a cistern cover that seals the tank body at the top, an opening for receiving a water supply element being provided in the upper region of the side wall of the tank body. In order to make simple mounting of the water supply element possible even in difficult installation situations, the cistern cover comprises a cavity at the top, in which cavity a further opening for receiving a water supply element is formed, which opening is provided with a removable seal by means of which the opening in the side wall of the tank body can be sealed when the water supply element is mounted in the opening of the cistern cover. The water passage for this built-in cistern comprises a flexible filling tube in order for it to be possible to connect the filling valve either to the water supply element mounted in the opening in the side wall, or to the water supply element mounted in the opening in the cistern cover, depending on the installation situation. The water passage is generally pre-mounted at the opening of the cistern side wall. Adaptation in order to mount the water passage at the top opening of the cistern cover is relatively complex.

SUMMARY OF THE INVENTION

Proceeding herefrom, an object of the invention is that of providing a cost-effective valve fitting for filling a sanitary cistern, in particular a built-in cistern, which fitting can be easily and relatively quickly adapted, in a variable manner, from an installation position at an opening in the left-hand cistern side wall to an installation position at an opening in the right-hand cistern side wall, and vice versa. Furthermore, a sanitary cistern for and/or comprising a valve fitting of this kind is to be provided.

The invention is based on the concept of designing the shutoff valve, in terms of the technical design and the outer geometry thereof, such that said valve can be used in different positions, preferably in a first position and, if necessary, in a second position rotated by approximately 90° relative thereto. The valve fitting (water passage) can thus be installed in a substantially mirror-symmetric manner in a cistern that comprises two opposing openings for receiving the connection element. The water supply line can thus be connected to the cistern in a variable manner, without complex adaptation and without a flexible filling tube.

The valve fitting according to the invention is characterised in that the actuation element of the shutoff valve is rotatable about a substantially horizontal rotational axis when the float is in the operating position thereof, the shutoff valve being designed so as to be operationally usable in the valve fitting in at least two different positions, the connection element being mounted or being able to be mounted at an opening in the left-hand cistern side wall in one of the positions, and at an opening in the right-hand cistern side wall in another of the positions, and the actuation element being accessible from the front of the valve fitting in the at least two positions of the shutoff valve.

This results in a cost-effective valve fitting for filling a sanitary cistern, which fitting can be easily and relatively quickly adapted, in a variable manner, from an installation position at an opening in the left-hand cistern side wall to an installation position at an opening in the right-hand cistern side wall, and vice versa.

A preferred embodiment of the valve fitting according to the invention is characterised in that the shutoff valve thereof is designed as an angle valve comprising pipe sockets that are arranged so as to be at an angle relative to one another. The advantage of this embodiment is that the filling valve can be arranged in a space-saving manner at a small spacing from the inside of the left-hand or right-hand cistern side wall, and therefore sufficient space remains for arranging and mounting a conventional cistern drain valve in each of the different installation positions of the valve fitting. It is therefore possible to particularly reliably rule out the possibility of the mounting of the cistern drain valve being hindered.

In this connection, in a further advantageous embodiment of the valve fitting according to the invention, the actuation element of the shutoff valve is formed in the shape of a lever, the lever length of the actuation element being dimensioned such that the freely protruding lever end of the actuation element does not project beyond the relevant pipe socket of the shutoff valve in the open as well as in the closed state of said shutoff valve, or such that said end terminates at a spacing of less than 10% of the lever length, measured from the rotational axis, before the end face of the pipe socket. A relatively long lever arm is thus achieved, and closing and opening the shutoff valve is made significantly easier, without impairing the variable arrangement of said valve.

According to a further embodiment of the valve fitting according to the invention, when the valve fitting is fully mounted, the rotational axis of the actuation element extends transversely to the longitudinal central axis of the connection element. Optimal accessibility of the actuation element relative to an inspection opening formed in the front of the cistern, in particular the built-in cistern, can thus be achieved, in particular when said actuation element is formed in the shape of a lever.

Another advantageous embodiment of the valve fitting according to the invention is characterised in that the filling valve is releasably connected to the shutoff valve by means of a pipe elbow. The pipe elbow makes it simpler to cost-effectively use a conventional filling valve in the valve fitting according to the invention. The pipe elbow in particular allows a particularly space-saving arrangement of a conventional filling valve in the cistern. The pipe elbow is preferably releasably connected to the filling valve by means of a screw connection comprising a union nut. This makes it possible to achieve a robust, watertight water supply line connection in a simple and reliable manner.

In order for it to be possible to particularly simply and reliably adapt the valve fitting from one pre-mounted installation position into the at least one other installation position, according to a further preferred embodiment of the invention the shutoff valve is releasably connected to the pipe elbow and to the connection element by means of plug-in connections, each plug-in connection being provided with a securing element, in particular a securing clamp. In this case, the relevant securing element can preferably be moved into a clamping or latching position by means of horizontal pressure, from the front of the shutoff valve.

Another advantageous embodiment of the valve fitting according to the invention is characterised in that the actuation element comprises a window-like recess that can be made to overlap the securing element. If, as mentioned above, the actuation element is formed in the shape of a lever, the window-like recess is arranged at the free end of the actuation element (lever) for example. The securing elements, which are designed as securing clamps for example, are preferably different colours (e.g. red and green), such that, when moving and rotating the shutoff valve, the fitter can in each case identify, on the other side of the cistern, whether the shutoff valve is open (actuation element overlapping the green securing element for example) or closed (actuation element overlapping the red securing element for example).

The shutoff valve of the valve fitting according to the invention is preferably formed as a ball valve, particularly preferably as a ball valve produced from plastics material. It is thus possible to produce the shutoff valve such that it has a relatively high flow coefficient and relatively small dimensions. In addition, a ball valve is typically characterised by a high degree of tightness, the tightness in the closed state of the ball valve results from the pressure of the medium or water. If the shutoff valve is formed as a ball valve produced from plastics material, further cost advantages result for the valve fitting according to the invention.

According to a further preferred embodiment of the invention, the actuation element comprises a cut-out in the portion thereof that is rotatably connected to the shutoff valve, which cut-out defines a recessed region relative to the front of the valve fitting. In this case, the shutoff valve is preferably provided with a limit stop that limits the rotation or pivot range of the actuation element, the cut-out allowing a clear view of the limit stop. The cut-out arranged in the region of the blocking member of the shutoff valve is favourable for achieving compact dimensions of the cistern, because it creates space for arranging another component. Moreover, the cut-out is advantageous in that said limit stop is visible and the rotation or pivot range of the actuation element is thus clearly identifiable.

A sanitary cistern, in particular a built-in cistern, for the valve fitting according to the invention is preferably designed such that a shoulder is formed both at the upper end of the left-hand cistern side wall and at the upper end of the right-hand cistern side wall, which shoulder defines a substantially vertical side wall portion and a shoulder surface that extends substantially transversely thereto, the vertical side wall portion being provided with an opening or a weakened point for forming an opening for receiving a connection element, and the filling valve being arranged underneath one of the two shoulders, when the valve fitting is fully mounted, such that the shoulder surface of the relevant shoulder extends over the filling valve. Each shoulder forms a protected region for connecting the connection element and the water supply line. The connection of the connection element and the water supply line arranged in the region of the shoulder can thus be largely protected from undesired mechanical influences.

According to a preferred embodiment of the cistern, the front thereof is provided, at the level of the shoulders, with an inspection opening that is arranged and dimensioned so as to align with an interior region of the cistern when viewed from the front of the cistern, in which region the actuation element of the shutoff valve is located at least in part when the valve fitting is fully mounted. In this case, the actuation element of the shutoff valve is very easily accessible.

BRIEF DESCRIPTION OF THE DRAWINGS

The invention will be described in greater detail hereinafter on the basis of drawings illustrating an embodiment. In the drawings.

DESCRIPTION OF THE INVENTION

Figure 1:
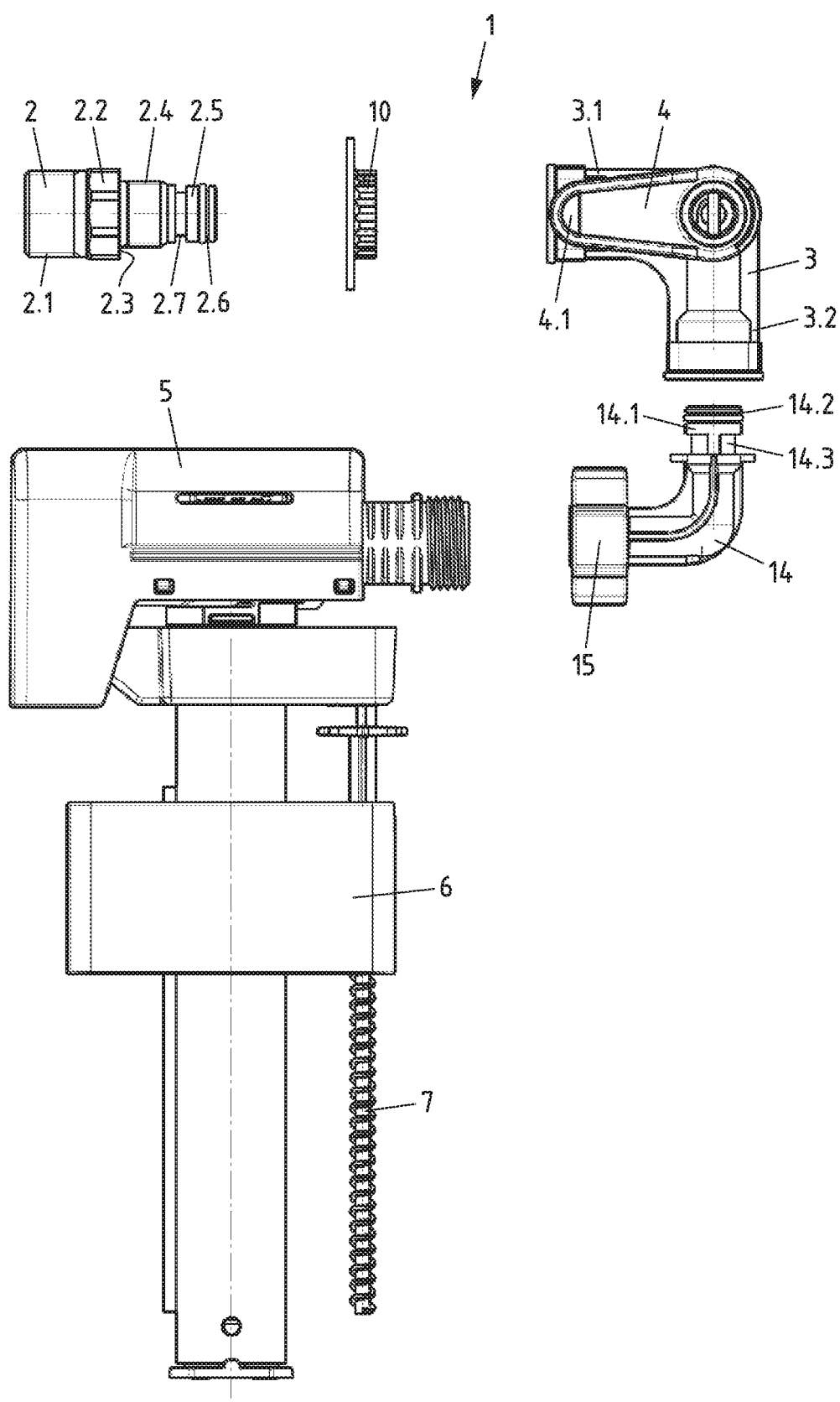
FIG. 1 is a front view of a valve fitting (water passage) comprising a connection element, a shutoff valve, a pipe elbow and a float-actuated filling valve according to the present invention, the components being shown separated from one another.
Figure 2:
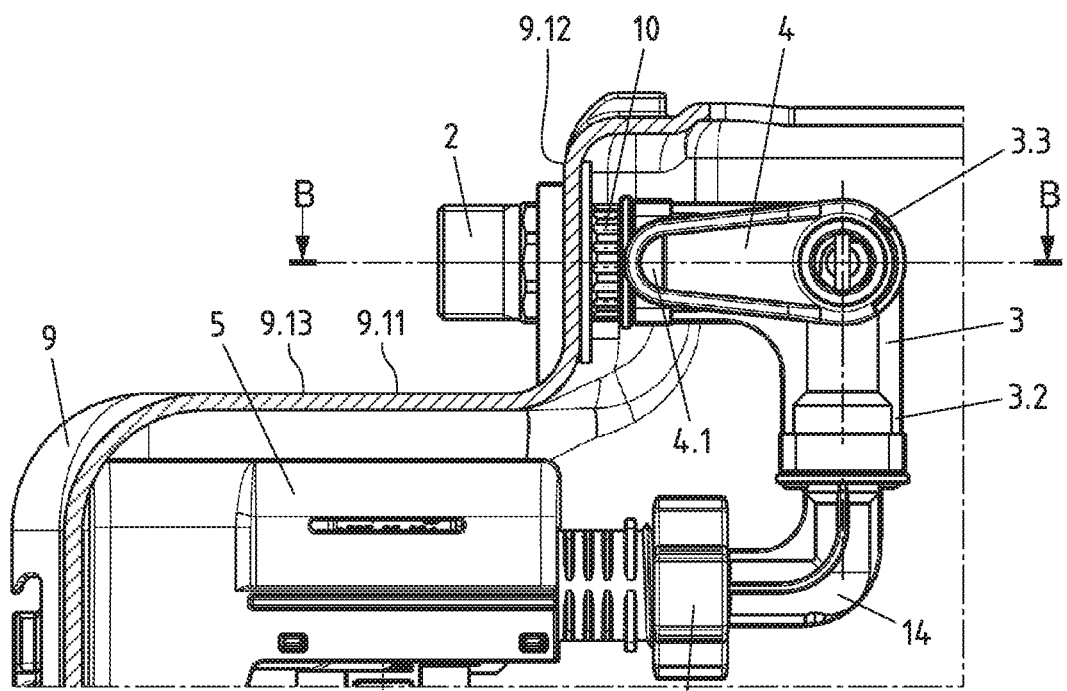
FIG. 2 is a front view of a portion of a cistern comprising the fully mounted valve fitting from FIG. 1, said valve fitting being mounted at an opening formed in the left-hand cistern wall.
Figure 3:
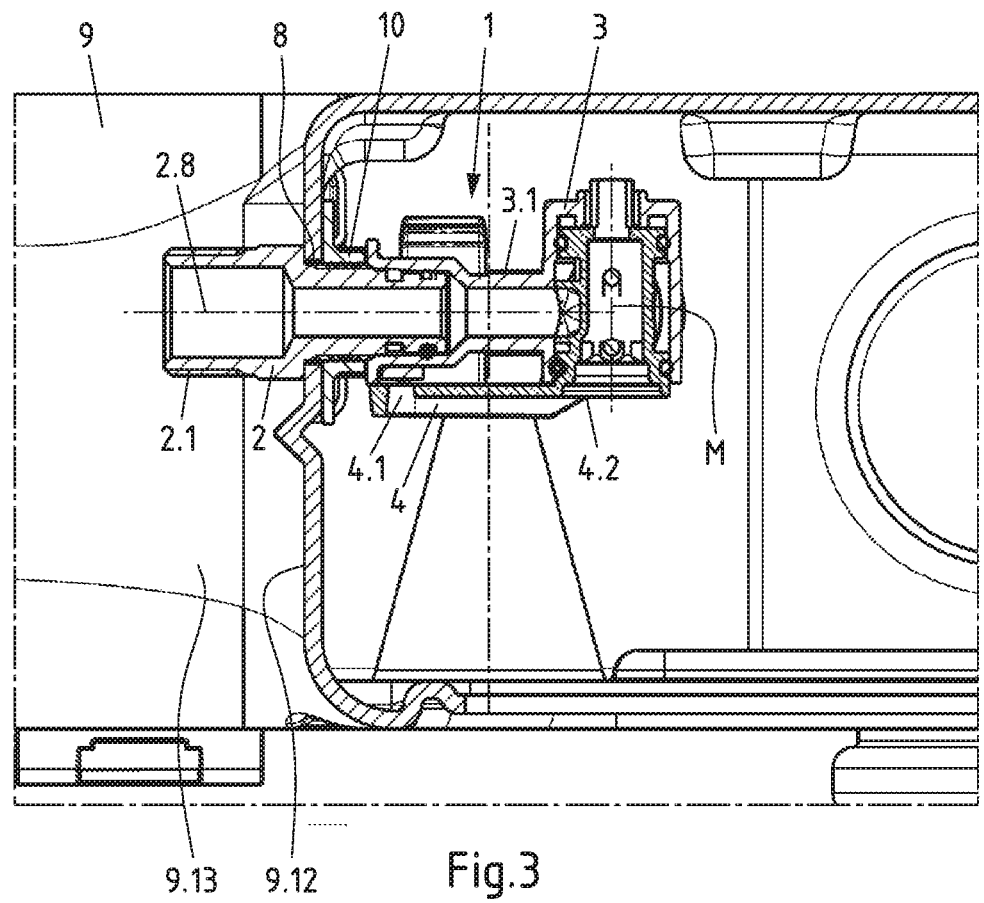
FIG. 3 is a sectional view of the valve fitting along the horizontal cutting line B-B in FIG. 2.

FIG. 1 is an exploded view of a valve fitting 1 for filling a sanitary cistern, in particular a built-in cistern, for a toilet or a urinal. The valve fitting 1 can also be referred to as a water passage or water supply channel. FIGS. 2 to 6 show components of the water passage or valve fitting 1 when mounted.

The valve fitting 1 defines a flow line through which water can be supplied to the cistern from a water supply line (not shown). The valve fitting 1 comprises a connection element 2 for connecting the valve fitting 1 to the water supply line, a shutoff valve 3 comprising an actuation element 4 for manually shutting off the water supply from the water supply line, and a float-actuated filling valve 5. The float 6 that is connected to the valve body of the filling valve 5 is moved upwards by a rising water level in the cistern, the filling valve 5 closing, and thus interrupting the inflow via the water passage, when a specified or specifiable water level has been reached. The desired amount of water in the cistern is continuously adjustable, and can be set by rotating a threaded rod 7 on the float 6.

The connection element 2 is formed in the manner of a pipe socket. Said element can also be referred to as a connection piece. The connection piece, i.e. the connection element 2, is non-positively connected to the water supply line. For this purpose, one of the ends of the connection element 2 preferably comprises an external thread 2.1, onto which a union nut (not shown) comprising a rubber-elastic sealing ring can be screwed. When the union nut is being screwed on, the sealing ring is axially compressed and in the process is pressed against the outer periphery of the water supply line in a radially sealing manner. Alternatively, the connection element 2 can also comprise a sleeve-like, plastically deformable portion (not shown), the inside of which is provided with a ring groove for receiving a rubber-elastic sealing ring, and which is pressed onto the water supply line inserted therein.

In addition to the external thread 2.1 or the plastically deformable sleeve portion, the connection element 2 comprises a polygonal, for example hexagonal, portion 2.2 that defines a radial shoulder or limit stop 2.3 for axially fixing the connection element 2 at an opening 8 of the cistern 9. An externally threaded portion 2.4 that can be inserted into the opening 8 of the cistern 9 adjoins the shoulder or limit stop 2.3, onto which portion a nut 10, preferably a flange nut, is screwed from the inside in order to fix the connection element 2.

Furthermore, the connection element 2 comprises a plug-in portion 2.5 for fitting the shutoff valve 3. The plug-in portion 2.5 extends from the externally threaded portion 2.4 that can be inserted into the cistern opening 8, as far as the inner end of the connection element 2, and is provided, on the outside, with at least one ring groove 2.6 for receiving a sealing ring. Moreover, the plug-in portion 2.5 is provided, on the outside thereof, with two transverse grooves that extend towards one another in parallel, or a ring groove 2.7, which are/is used to receive portions of a securing element 11, preferably a securing clamp, for axially securing the fitted shutoff valve 3.

In the operational position of the float 6, i.e. in the intended mounting position of the shutoff valve 3, the actuation element 4 of the shutoff valve 3 is rotatable about a substantially horizontal rotational axis M. The mechanics and the outer geometry of the shutoff valve 3 are designed such that said valve can be used in different positions in the valve fitting (water passage) 1, the connection element 2 being mounted at an opening 8 in the left-hand cistern side wall 9.1 in one of said positions, and at an opening 8' in the right-hand cistern side wall 9.2 in another of said different positions. For this purpose, the shutoff valve 3 is preferably designed as an angle valve. The two pipe sockets 3.1, 3.2 of the shutoff valve 3, which sockets are arranged at an angle relative to one another, can each be fitted to the plug-in portion 2.5 of the connection element (connection piece) 2 and, when fitted, can be axially fixed by a securing element 11, preferably a securing clamp.

Figure 4:
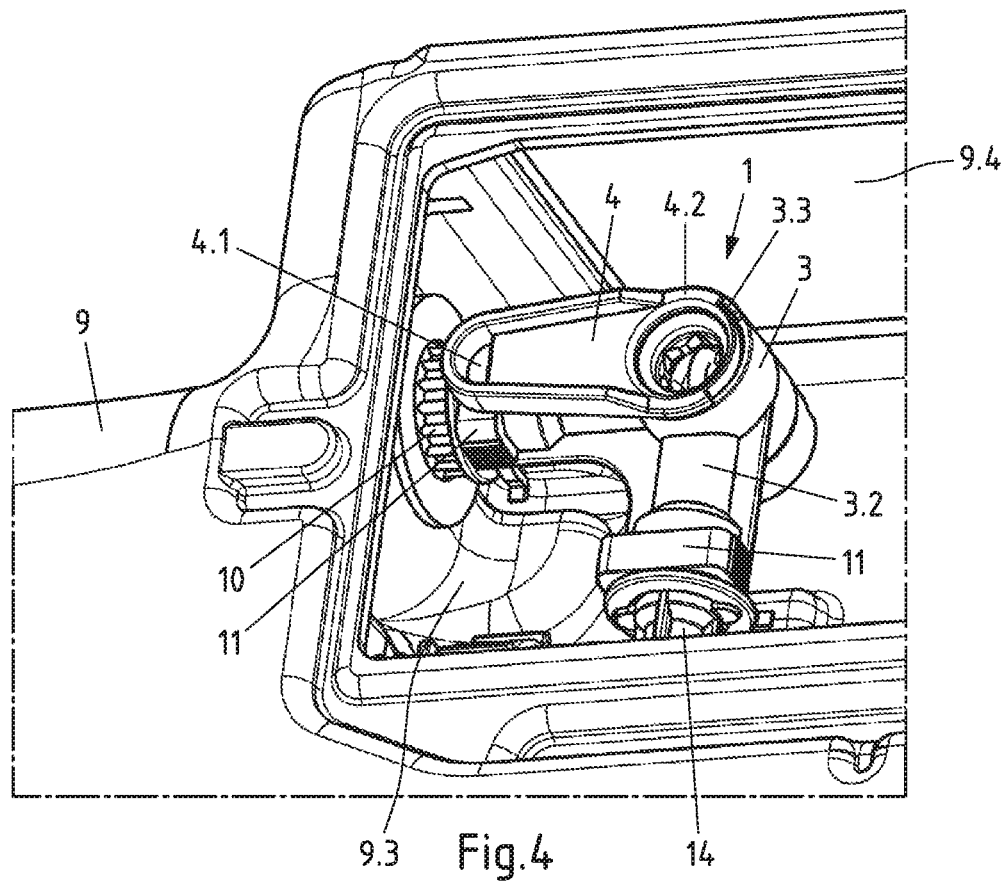
FIG. 4 is a perspective view from below of a portion of the cistern from FIG. 2 comprising the mounted valve fitting.
Figure 5:
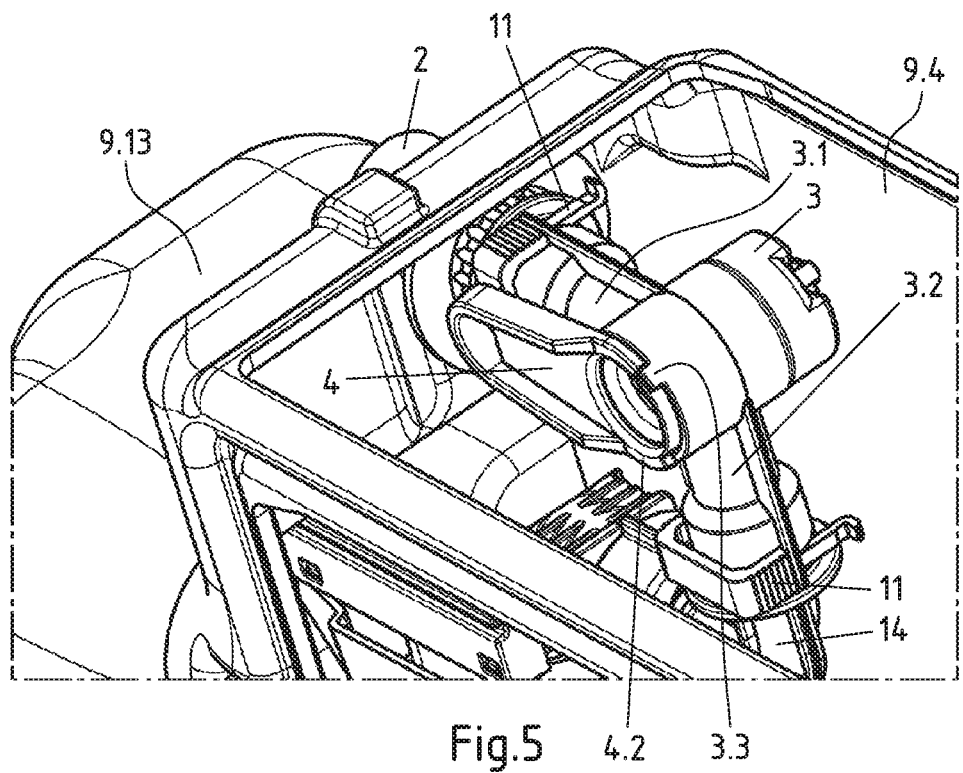
FIG. 5 is a perspective view from above of a portion of the cistern from FIG. 2 comprising the mounted valve fitting.
Figure 6:
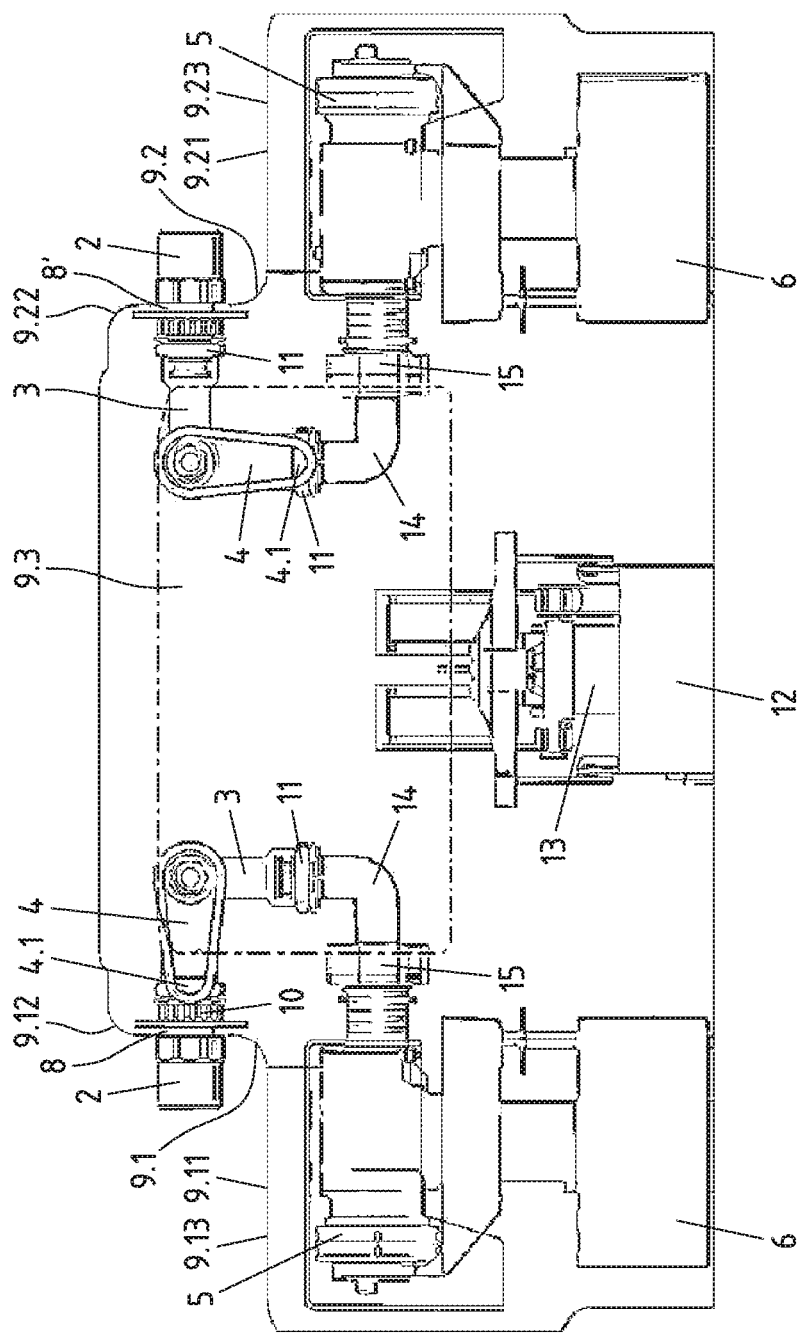
FIG. 6 is a front view of a top, rear portion of a cistern according to the invention, in which, in order to illustrate the variable arrangement of the valve fitting according to the invention, said fitting is shown in two possible mounting positions and the inspection opening of the cistern is indicated by a dot-dash line.

Proceeding from the installation position shown in FIGS. 2 to 5, by being rotated by approximately 90°, the shutoff valve 3 can thus also be used at an opening 8' in the right-hand cistern side wall 9.2 (cf. FIG. 6). The actuation element 4 is accessible from the front of the valve fitting 1 in each of the positions of the shutoff valve 3 shown in FIG. 6. When the valve fitting 1 is fully mounted, the rotational axis M of the actuation element 4 extends transversely to the longitudinal central axis 2.8 of the connection element 2.

In the embodiment shown, the cistern 9 is provided with a shoulder 9.11, 9.21 both at the upper end of the left-hand cistern side wall 9.1 and at the upper end of the right-hand cistern side wall 9.2, which shoulder defines a substantially vertical side wall portion 9.12, 9.22 and a shoulder surface 9.13, 9.23 that extends transversely thereto. In the delivery condition of the cistern 9, the vertical side wall portion 9.12 comprises an opening 8 or 8' for receiving the connection element (connection piece) 2, or a weakened point for forming an opening 8, 8' of this kind.

The front of the cistern 9 is provided, at the level of the shoulders 9.11, 9.21, with an inspection opening 9.3 that is arranged and dimensioned so as to align with an interior region of the cistern 9 when viewed from the front of the cistern 9, in which region the actuation element 4 of the shutoff valve 3 is located at least in part when the valve fitting 1 is fully mounted (cf. FIG. 6). In addition, the top of the cistern 9 is preferably also provided with an inspection opening 9.4.

The actuation element 4 of the shutoff valve 3 is preferably formed in the shape of a lever. In this case, the lever length is dimensioned such that the freely protruding lever end of the actuation element 4 does not project beyond the relevant pipe socket of the mutually angled pipe sockets 3.1, 3.2 in the open as well as in the closed state of the shutoff valve 3.

The actuation element 4 comprises a window-like recess 4.1 which overlaps the relevant securing element 11 in the open position and/or the closed position of the shutoff valve 3. The securing element 11 is visible through the recess 4.1. The two securing elements 11, which are formed as fixing clamps for example, are preferably different colours. For example, one securing element 11 is produced from red material, whereas the other securing element 11 is produced from green material. The different colouring of the securing element 11 provides a fitter with a clearly and quickly perceptible indication of the state that the shutoff valve 3 is in when the actuation element 4 overlaps one or the other securing element 11. For example, a red securing element 11 may indicate the closed position of the shutoff valve for example, while the other, for example green, securing element 11 indicates the open position of the shutoff valve 3.

Moreover, it can be seen in particular in FIGS. 4 and 5 that the actuation element 4 comprises a cut-out 4.2 in the region of the blocking member of the shutoff valve 3. The front of the actuation element 4 is provided with a protruding rib. The rib extends along the periphery of the lever-shaped portion of the actuation element 4 and is therefore substantially U-shaped. In contrast, the cut-out 4.2 defines a recessed region relative to the front of the valve fitting 1 or the front of the actuation element 4. The shutoff valve 3 is provided with a limit stop 3.3 which limits the rotation range of the actuation element 4. The limit stop 3.3 or the pivot range of the actuation element 4 is visible on account of the cut-out 4.2.

In FIG. 6, reference sign 12 denotes a drain valve, of which the valve body 13, which is formed as an overflow pipe, can be raised by means of an actuation device (not shown) in order to trigger a flushing process, in particular a partial or full flush.

The float-actuated filling valve 5 is preferably releasably connected to the shutoff valve 3 by means of a pipe elbow 14. The pipe elbow 14 is dimensioned such that, when the valve fitting 1 is fully mounted, the filling valve 5 is arranged underneath one of the two shoulders 9.11, 9.21 of the cistern, and specifically such that the shoulder surface 9.13 or 9.23 of the relevant shoulder extends over the filling valve 5. The pipe elbow 14 is releasably connected to the filling valve 5 by means of a screw connection comprising a union nut 15. The pipe elbow is preferably fitted to the filling valve 5 outside the cistern 9 and mounted on a threaded connector of the filling valve 5 by means of the union nut 15. The filling valve 5 is subsequently inserted, together with the pipe elbow 14, in the cistern, at the underside of the shutoff valve 3 and in the substantially vertically extending pipe socket 3.2 thereof, and fixed by means of a securing element 11, preferably a securing clamp. For this purpose, the insertion end 14.1 of the pipe elbow 14 associated with the shutoff valve 3 comprises a ring groove 14.2 for receiving a sealing ring, and a ring groove 14.3 that is axially spaced therefrom, the inserted securing element 11 positively engaging in said latter ring groove.

The shutoff valve 3 is thus releasably connected to the pipe elbow 14 and to the connection element 2 by means of plug-in connections, each of the plug-in connections being provided with a securing element 11. In this case, the relevant securing element 11 can be moved into a clamping or latching position by means of horizontal pressure, from the front of the shutoff valve 3.

The invention is not limited to the embodiment shown in the drawings. On the contrary, numerous variations are conceivable which also make use of the invention defined in the claims, even if their form is fundamentally different from the example shown.

The invention claimed is:

1. A valve fitting for filling a sanitary cistern, comprising:
   a connection element for connecting the valve fitting to a water supply line,
   a shutoff valve comprising an actuation element for manually shutting off the inflow from the water supply line, and
   a float-actuated filling valve,
   the connection element, the shutoff valve and the float-actuated filling valve being releasably interconnected in order to form a water passage such that water can be supplied from the water supply line into the interior of the sanitary cistern, and
   a float connected to the float-actuated filling valve being movable by a rising water level in the sanitary cistern, and
   the float-actuated filling valve closing, and thus interrupting the inflow via the water passage, when a specified or specifiable water level has been reached,
   wherein the actuation element of the shutoff valve is rotatable about a substantially horizontal rotational axis when the float is in an operating position thereof, the shutoff valve being designed so as to be operationally usable in the valve fitting in at least two different positions, the connection element configured to be mounted at an opening in a left-hand cistern side wall in one of the at least two different positions, and at an opening in a right-hand cistern side wall in another of the at least two different positions, and
   the actuation element being accessible from a front of the valve fitting in the at least two different positions of the shutoff valve in each case in the operating position of the actuation element,
   wherein the float-actuated filling valve is releasably connected to the shutoff valve by means of a pipe elbow,
   wherein the shutoff valve is releasably connected to the pipe elbow and to the connection element by means of plug-in connections, each of the plug-in connections being provided with a securing clamp.

2. The valve fitting according to claim 1, wherein, when the valve fitting is fully mounted, the substantially horizontal rotational axis of the actuation element extends transversely to a longitudinal central axis of the connection element.

3. The valve fitting according to claim 1, wherein the pipe elbow is releasably connected to the float-actuated filling valve by means of a screw connection comprising a union nut.

4. The valve fitting according to claim 1, wherein the relevant securing clamp can be moved into a clamping or latching position by means of horizontal pressure, from a front of the shutoff valve.

5. The valve fitting according to claim 1, wherein the actuation element comprises a recess that can be made to overlap the respective securing clamp.

6. The valve fitting according to claim 1, wherein the shutoff valve is formed as a ball valve.

7. The valve fitting according to claim 1, wherein the shutoff valve is designed as an angle valve comprising pipe sockets that are arranged so as to be at an angle relative to one another.

8. The valve fitting according to claim 7, wherein the actuation element of the shutoff valve is formed in the shape of a lever, a lever length of the actuation element being dimensioned such that a freely protruding lever end of the actuation element terminates at a spacing of less than 10% of the lever length, the spacing being measured from the rotational axis of the actuation element to an end face of the respective pipe socket.

9. The valve fitting according to claim 7, wherein the actuation element of the shutoff valve is formed in the shape of a lever, a lever length of the actuation element being dimensioned such that a freely protruding lever end of the actuation element does not project beyond a first of the pipe sockets in an open state of the shutoff valve and the freely protruding lever end does not project beyond a second of the pipe sockets in a closed state of the shutoff valve.

10. The valve fitting according to claim 1, wherein the actuation element comprises a cut-out in a portion thereof that is rotatably connected to the shutoff valve, which cut-out defines a recessed region relative to the front of the valve fitting.

11. The valve fitting according to claim 10, wherein the shutoff valve is provided with a limit stop which limits the rotation range of the actuation element, the cut-out allowing a clear view of the limit stop.

12. A sanitary cistern comprising a left-hand cistern side wall and a right-hand cistern side wall and the valve fitting according to claim 1, wherein a shoulder is formed both at the upper end of the left-hand cistern side wall and at the upper end of the right-hand cistern side wall, each shoulder defining a substantially vertical side wall portion and a shoulder surface that extends substantially transversely thereto, the substantially vertical side wall portion being provided with an opening or a weakened point for forming an opening, and the float-actuated filling valve being arranged underneath one of the two shoulders, when the valve fitting is fully mounted, such that the shoulder surface of the respective shoulder which the float-actuated filling valve is arranged underneath extends over the float-actuated filling valve.

13. The sanitary cistern according to claim 12, wherein a front of the sanitary cistern is provided with an inspection opening at a level of the shoulders, wherein the inspection opening is arranged and dimensioned so as to align with an interior region of the sanitary cistern when viewed from the front of the sanitary cistern, wherein the actuation element of the shutoff valve is located, at least in part, in the interior region of the sanitary cistern, when the valve fitting is fully mounted.

* * * * *